(12) United States Patent
Nakayama et al.

(10) Patent No.: US 11,053,856 B2
(45) Date of Patent: Jul. 6, 2021

(54) STARTING DEVICE FOR GAS TURBINE ENGINE

(71) Applicant: KAWASAKI JUKOGYO KABUSHIKI KAISHA, Kobe (JP)

(72) Inventors: Satoshi Nakayama, Kobe (JP); Akihisa Oka, Kakogawa (JP); Hiroki Seike, Hiroshima (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 132 days.

(21) Appl. No.: 16/440,393

(22) Filed: Jun. 13, 2019

(65) Prior Publication Data

US 2020/0032714 A1    Jan. 30, 2020

Related U.S. Application Data

(63) Continuation of application No. PCT/JP2017/044270, filed on Dec. 11, 2017.

(30) Foreign Application Priority Data

Dec. 14, 2016  (JP) .............................. JP2016-242357

(51) Int. Cl.
  *F02C 7/275*   (2006.01)
  *F02C 7/268*   (2006.01)

(52) U.S. Cl.
  CPC .............. *F02C 7/275* (2013.01); *F02C 7/268* (2013.01)

(58) Field of Classification Search
  CPC .. F02C 7/06; F02C 7/275; F02C 7/268; F05D 2260/85; F05D 2260/4031; F01D 19/00; F01D 25/18; F01D 25/20
  See application file for complete search history.

(56) References Cited

U.S. PATENT DOCUMENTS

| | | | |
|---|---|---|---|
| 2,663,994 A | 12/1953 | Lombard et al. | |
| 2,728,234 A | 12/1955 | Volk, Jr. et al. | |
| 2,962,597 A * | 11/1960 | Evans | F02C 7/26 290/2 |
| 2,975,783 A | 3/1961 | Dallenbach | |
| 3,157,993 A * | 11/1964 | Duttmann | F02C 7/32 60/788 |
| 3,943,374 A * | 3/1976 | Clements | F01D 5/026 290/52 |
| 3,976,165 A * | 8/1976 | Pilarczyk | F04D 25/04 184/6.16 |

(Continued)

FOREIGN PATENT DOCUMENTS

| | | | | |
|---|---|---|---|---|
| GB | 620328 A | * | 3/1949 | ............. B63H 23/08 |
| JP | 46-36402 A | | 10/1971 | |

(Continued)

*Primary Examiner* — William H Rodriguez
(74) *Attorney, Agent, or Firm* — Sughrue Mion, PLLC

(57) ABSTRACT

A starting device for driving a compressor-side rotary shaft of a two-shaft type gas turbine engine at a time of starting the gas turbine engine includes: a starter motor serving as a drive source for the compressor-side rotary shaft; a speed increaser configured to increase a speed of rotation of the starter motor; and a clutch mechanism configured to disconnectably connect the starter motor and the compressor-side rotary shaft with each other, the clutch mechanism being provided between the compressor-side rotary shaft and the speed increaser.

4 Claims, 3 Drawing Sheets

(56) References Cited

U.S. PATENT DOCUMENTS

| | | | | |
|---|---|---|---|---|
| 4,062,186 | A | * 12/1977 | Snow | F02C 7/275 60/226.1 |
| 10,174,630 | B2 | 1/2019 | Scarponi et al. | |
| 2006/0207254 | A1* | 9/2006 | Labala | F01D 25/18 60/605.3 |
| 2012/0063883 | A1* | 3/2012 | Bei | F02C 9/00 415/1 |
| 2015/0191250 | A1* | 7/2015 | DeVita | F02C 7/262 701/3 |
| 2015/0285089 | A1 | 10/2015 | Scarponi et al. | |
| 2019/0128141 | A1* | 5/2019 | Pech | F02C 7/12 |
| 2019/0195141 | A1* | 6/2019 | Nagafuchi | F02C 7/275 |

FOREIGN PATENT DOCUMENTS

| | | |
|---|---|---|
| JP | 56-132420 A | 10/1981 |
| JP | 58-77132 U | 5/1983 |
| JP | 60-81235 U1 | 6/1985 |
| JP | 1-124338 U1 | 8/1989 |
| JP | 2009-191815 A | 8/2009 |
| JP | 2015-535046 A | 12/2015 |
| WO | 2014/072433 A1 | 5/2014 |

* cited by examiner

STARTING DEVICE FOR GAS TURBINE ENGINE

CROSS REFERENCE TO THE RELATED APPLICATION

This application is a continuation application, under 35 U.S.C. § 111(a), of international application No. PCT/JP2017/044270, filed Dec. 1, 2017, which claims priority to Japanese patent application No. 2016-242357, filed Dec. 14, 2016, the disclosure of which are incorporated by reference in their entirety into this application.

BACKGROUND OF THE INVENTION

Field of the Invention

The present invention relates to a starting device for starting a gas turbine engine.

Description of Related Art

In general, in a two-shaft type gas turbine engine, it has been proposed that, at the time of starting, a high-pressure shaft for driving a compressor is driven by a starting motor, and after shifting to a steady operation, the starting motor is disconnected from the high-pressure shaft by a clutch mechanism (see, for example, Patent Document 1). In addition, normally, the rotation speed of the starting motor is lower than a rotation speed needed for starting the gas turbine engine, and therefore, the starting motor is configured to drive the high-pressure shaft via a speed increaser.

RELATED DOCUMENT

Patent Document

[Patent Document 1] JP Laid-open Patent Publication No. 2015-535046

SUMMARY OF THE INVENTION

However, in the starting device having such a configuration, in the case where the starting motor is merely disconnected from the drive system by the clutch mechanism, the speed increaser continues to be driven using a driving force of the gas turbine engine even after the gas turbine engine shifts to a steady operation. In this case, power loss occurs due to wasteful driving of the speed increaser.

An object of the present invention is to provide a starting device for a gas turbine engine, that enables reduction of power loss of a two-shaft type gas turbine engine by performing connection and disconnection of the drive system appropriately in accordance with the operation condition of the gas turbine engine, in order to solve the above problem.

In order to attain the above object, a starting device for a gas turbine engine according to the present invention is a starting device for driving a compressor-side rotary shaft of a two-shaft type gas turbine engine at a time of starting the gas turbine engine, the starting device including: a starter motor that serves as a drive source for the compressor-side rotary shaft; a speed increaser configured to increase a speed of rotation of the starter motor; and a clutch mechanism configured to disconnectably connect the starter motor and the compressor-side rotary shaft with each other, the clutch mechanism being provided between the compressor-side rotary shaft and the speed increaser.

In the above configuration, the clutch mechanism is provided not between the starter motor and the speed increaser but between the compressor-side rotary shaft and the speed increaser. Therefore, in a steady operation in which the speed increaser need not be used, connection between the speed increaser and the compressor-side rotary shaft is disconnected by an action of the clutch mechanism. Thus, after disconnection of the clutch mechanism in a steady operation or the like, occurrence of power loss due to wasteful driving of the speed increaser by the compressor-side rotary shaft is avoided.

In one embodiment of the present invention, the clutch mechanism may be attached to the gas turbine engine, and the clutch mechanism may have at least one of a clutch oil supply path provided so as to communicate with an oil supply path of the gas turbine engine, and a clutch oil discharge path provided so as to communicate with an oil discharge path of the gas turbine engine. In the above configuration, the clutch mechanism is attached to the gas turbine engine, whereby the oil supply/discharge paths are partially shared between the gas turbine engine and the clutch mechanism. Thus, the entire starting device can be configured compactly.

In one embodiment of the present invention, the starting device may further include a coupling mechanism provided between the speed increaser and the clutch mechanism and configured to transmit an output of the speed increaser to a gas turbine engine side, and the coupling mechanism may connect a rotary shaft on the speed increaser side and a rotary shaft on the gas turbine engine side with each other such that the rotary shaft on the gas turbine engine side is displaceable in an axial direction relative to the rotary shaft on the speed increaser side. In the above configuration, change in the face-to-face dimension between the speed increaser and the gas turbine engine due to thermal expansion of the gas turbine engine can be absorbed by the coupling mechanism.

In one embodiment of the present invention, the clutch mechanism may include a clutch casing fixed to an engine casing, an engine-side engagement portion fixed to the compressor-side rotary shaft, and a speed-increaser-side engagement portion fixed to the rotary shaft on the speed increaser side, the clutch casing may be detachably attached to the engine casing, and the engine-side engagement portion may be detachably attached to the compressor-side rotary shaft. In the above configuration, it is possible to attach the starting device to the gas turbine engine without disassembling the gas turbine engine. Therefore, it becomes possible to combine even a conventional gas turbine engine with the starting device without changing the specifications thereof.

A gas turbine engine system according to the present invention includes: the starting device having any of the above configurations; a two-shaft type gas turbine engine configured to be started by the starting device; and an oil supply device configured to supply a lubricating oil to the starting device and the gas turbine engine and to be driven independently of the starting device and the gas turbine engine. By employing the oil supply device driven independently of the drive system of the starting device and the gas turbine engine as described above, the clutch mechanism which disconnectably connects the starter motor and the compressor-side rotary shaft with each other can be provided between the compressor-side rotary shaft and the speed increaser.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, embodiments according to the present invention will be described with reference to the drawings, but the present invention is not limited to the embodiments.

Figure 1:
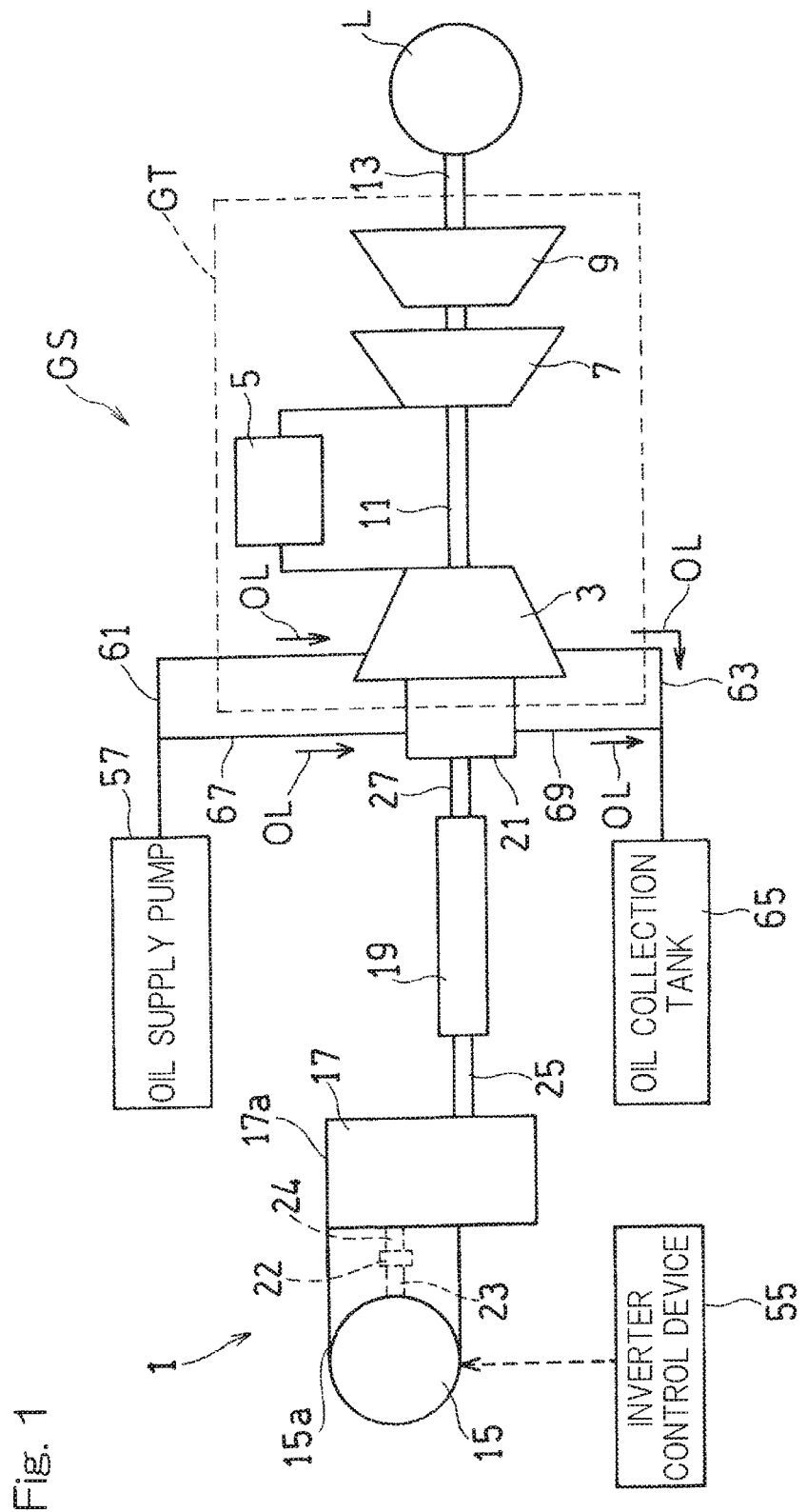
FIG. 1 is a block diagram showing the entire configuration of a starting device according to one embodiment of the present invention and a gas turbine engine to which the starting device is applied.

FIG. 1 is a schematic configuration diagram showing a starting device 1 according to one embodiment of the present invention and a gas turbine engine (hereinafter, simply referred to as a "gas turbine") GT to which the starting device 1 is applied. The gas turbine GT to which the starting device 1 according to the present embodiment is applied is a two-shaft type gas turbine engine. That is, the gas turbine GT includes a compressor 3 for compressing an air, a combustor 5 for mixing the air compressed by the compressor 3 with a fuel and combusting the air-fuel mixture, a high-pressure turbine 7 which is driven by the combusted air to drive the compressor 3, and a low-pressure turbine 9 for driving a load L. The high-pressure turbine 7 and the compressor 3 are connected to each other via a compressor-side rotary shaft 11. The low-pressure turbine 9 is connected to the load L via a turbine-side rotary shaft 13 which is an output shaft of the gas turbine GT and is not connected to the compressor-side rotary shaft 11. The starting device 1, the gas turbine GT, and the peripheral equipment constitute a gas turbine system GS.

The starting device 1 for the gas turbine GT according to the present embodiment drives the compressor-side rotary shaft 11 of the gas turbine GT at the time of starting the gas turbine GT. The starting device 1 includes a starter motor 15, a speed increaser 17, and a clutch mechanism 21. The starter motor 15 serves as a drive source for driving the compressor-side rotary shaft 11. The speed increaser 17 increases the speed of rotation output from the starter motor 15 and transmits the resultant rotation to the gas turbine GT side. In the shown example, a first coupling mechanism 19 is provided between the speed increaser 17 and the compressor-side rotary shaft 11, whereby output of the speed increaser 17 is transmitted to the gas turbine GT side. The clutch mechanism 21 disconnectably connects the starter motor 15 and the compressor-side rotary shaft 11 with each other. The clutch mechanism 21 is provided between the compressor-side rotary shaft 11 and the speed increaser 17. That is, in a drive system between the starter motor 15 and the compressor-side rotary shaft 11, the speed increaser 17 is provided only on the starter motor 15 side with respect to the clutch mechanism 21, and no speed increaser 17 is provided between the clutch mechanism 21 and the compressor-side rotary shaft 11.

More specifically, the clutch mechanism 21 is attached to the gas turbine GT. Thus, the clutch mechanism 21 is provided between the first coupling mechanism 19 and the compressor-side rotary shaft 11. In addition, in the present embodiment, the clutch mechanism 21 is detachably attached to the gas turbine GT. The attachment structure of the clutch mechanism 21 to the gas turbine GT will be described in detail later.

The speed increaser 17 is configured as a gear device having a plurality of gears combined. In the shown example, the speed increaser 17 and the starter motor 15 are connected to each other so as to rotate together via a short-small-sized second coupling mechanism 22. That is, the second coupling mechanism 22 is provided between a starter motor output shaft 23 and a speed increaser input shaft 24. A casing 15a of the starter motor 15 and a casing 17a of the speed increaser 17 are coupled with each other. Specifically, the speed increaser 17 includes an input gear to which rotational power is inputted, and an output gear which is directly or indirectly engaged with the input gear and which increases the speed of the rotational power inputted to the input gear and outputs the resultant rotational power. The rotational power inputted from the starter motor 15 to the input gear is outputted from the output gear through a speed increaser output shaft 25.

The speed increaser output shaft 25 is connected to a clutch input shaft 27 of the clutch mechanism 21 via the first coupling mechanism 19. In the first coupling mechanism 19, a rotary shaft on the speed increaser 17 side and a rotary shaft positioned on the gas turbine GT side with respect to the first coupling mechanism 19 are connected to each other such that the rotary shaft on the gas turbine GT side is displaceable in the axial direction relative to the rotary shaft on the speed increaser 17 side. It is noted that the first coupling mechanism 19 may be configured to be capable of absorbing misalignment and plane tilt between the rotary shaft on the speed increaser 17 side and the rotary shaft on the gas turbine GT side.

Figure 2:
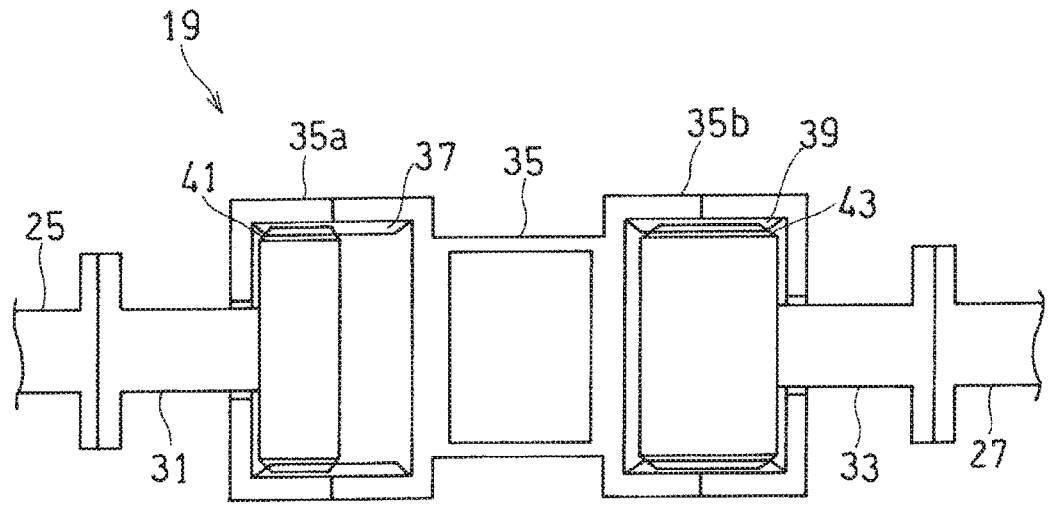
FIG. 2 is a sectional view schematically showing a coupling mechanism used for the starting device shown in FIG. 1.

Specifically, as shown in FIG. 2, the first coupling mechanism 19 includes an input-side hub 31 which is a rotary shaft on the speed increaser side, an output-side hub 33 which is a rotary shaft on the clutch side (i.e., the gas turbine GT side with respect to the first coupling mechanism 19), and a cylindrical coupling sleeve 35 connected to the hubs 31, 33 so as to be unable to rotate relative to the hubs 31, 33. The input-side hub 31 is connected to the speed increaser output shaft 25 via a connection flange provided at an end on the speed increaser 17 side such that the input-side hub 31 is unable to rotate relative to the speed increaser output shaft 25. The output-side hub 33 is connected to the clutch input shaft 27 via a connection flange provided at an end on the clutch side such that the output-side hub 33 is unable to rotate relative to the clutch input shaft 27.

The first coupling mechanism 19 is configured as a gear coupling. That is, input-side sleeve spline teeth 37 which are internal teeth are formed on the inner circumferential surface of an input-side connection portion 35a of the coupling sleeve 35. Similarly, output-side sleeve spline teeth 39 which are internal teeth are formed on the inner circumferential surface of an output-side connection portion 35b of the coupling sleeve 35. On the other hand, input-side hub spline teeth 41 which are external teeth are formed on the outer circumferential surface of a connection portion of the input-side hub 31, and output-side hub spline teeth 43 which are external teeth are formed on the outer circumferential surface of a connection portion of the output-side hub 33. The input-side hub spline teeth 41 of the input-side hub 31 are fitted to the input-side sleeve spline teeth 37 of the coupling sleeve 35, and the output-side hub spline teeth 43 of the output-side hub 33 are fitted to the output-side sleeve spline teeth 39 of the coupling sleeve 35, whereby rotational output of the speed increaser output shaft 25 is transmitted to the clutch input shaft 27 on the gas turbine GT side.

In the shown example, the axial length of the input-side sleeve spline teeth 37 of the coupling sleeve 35 is set to be longer than the axial length of the input-side hub spline teeth 41 of the input-side hub 31. That is, the input-side sleeve spline teeth 37 of the coupling sleeve 35 are connected slidably with respect to the input-side hub spline teeth 41 of the input-side hub 31. The axial length of the output-side sleeve spline teeth 39 of the coupling sleeve 35 is equal to the axial length of the output-side hub spline teeth 43 of the output-side hub 33 so that relative movement in the axial direction does not occur at the output-side connection portion 35b. In this way, the rotary shaft on the speed increaser side (in this example, speed increaser output shaft 25) and the rotary shaft positioned on the gas turbine GT side with respect to the first coupling mechanism 19 (in this example, clutch input shaft 27) are connected to each other such that the rotary shaft on the gas turbine GT side is displaceable in the axial direction relative to the rotary shaft on the speed increaser side.

Figure 3:
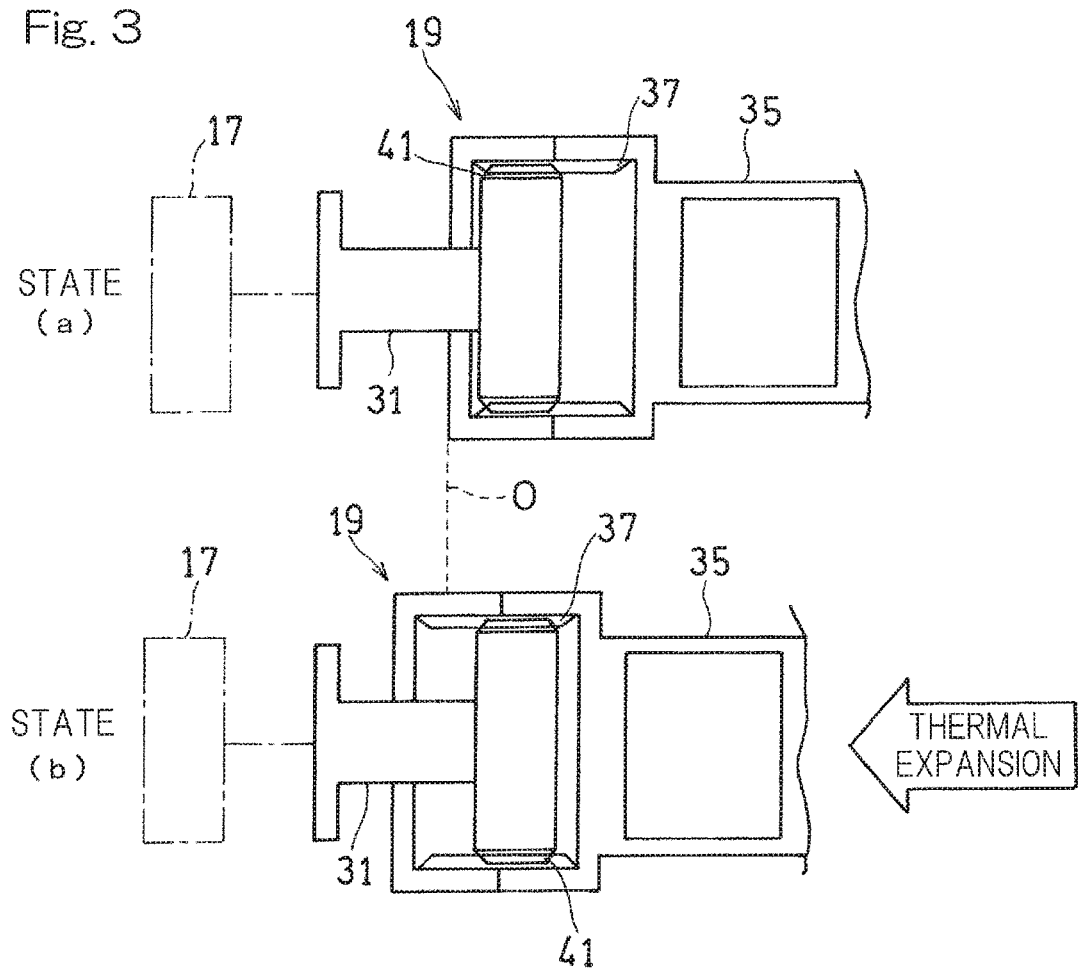
FIG. 3 is a sectional view schematically showing operation of the coupling mechanism shown in FIG. 2.

The entire gas turbine GT shown in FIG. 1 is supported so as to be able to be thermally expanded with respect to a rear support which supports a turbine part positioned at the rear side. Therefore, as schematically shown in FIG. 3, in the first coupling mechanism 19, the coupling sleeve 35 that has been positioned at a reference position O in a state (a) of not being thermally expanded is displaced to the speed increaser 17 side in the axial direction relative to the input-side hub 31 in a state (b) of being thermally expanded. In this way, change in the face-to-face dimension between the speed increaser 17 and the gas turbine GT due to thermal expansion of the gas turbine GT is absorbed by the first coupling mechanism 19. It is noted that the difference between the axial length of the input-side sleeve spline teeth 37 of the coupling sleeve 35 and the axial length of the input-side hub spline teeth 41 of the input-side hub 31 is set to be greater than the maximum thermal expansion amount of the gas turbine GT that can be assumed.

Figure 4:
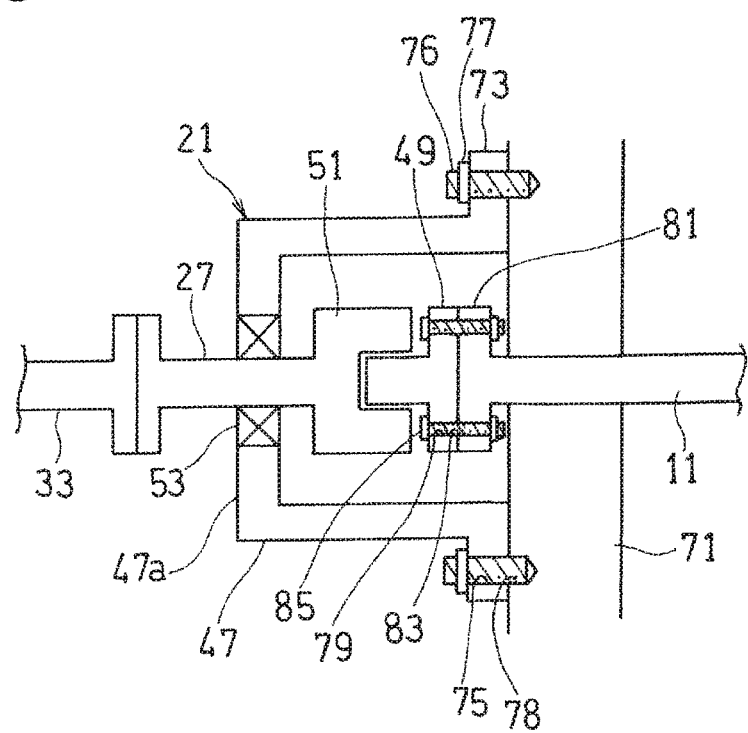
FIG. 4 is a sectional view schematically showing the attachment structure of a clutch mechanism used for the starting device shown in FIG. 1.

As shown in FIG. 4, the clutch mechanism 21 is in the form of a so-called automatic clutch, and includes a clutch casing 47, an engine-side engagement portion 49 fixed to the compressor-side rotary shaft 11, and a speed-increaser-side engagement portion 51 fixed to the rotary shaft on the speed increaser side (in this example, the output-side hub 33 of the first coupling mechanism 19). In detail, the speed-increaser-side engagement portion 51 is provided to one end of the clutch input shaft 27, the other end of which is fixed to the output-side hub 33. The engine-side engagement portion 49 and the speed-increaser-side engagement portion 51 are engaged with or separated from each other by a centrifugal force, whereby connection or disconnection between the starter motor 15 (FIG. 1) and the compressor-side rotary shaft 11 is performed. The clutch casing 47 is formed in a bottomed cylindrical shape, and is positioned such that a bottom portion 47a thereof faces the speed increaser side. The clutch input shaft 27 is rotatably supported via a bearing 53 in a rotary shaft insertion hole provided at a center part of the bottom portion 47a.

At the time of starting the gas turbine GT shown in FIG. 1, the starter motor 15 and the compressor-side rotary shaft 11 are connected to each other by the clutch mechanism 21, and thereby the compressor-side rotary shaft 11 is driven by the starter motor 15. Thereafter, in a steady operation of the gas turbine GT, connection between the starter motor 15 and the compressor-side rotary shaft 11 is disconnected by the clutch mechanism 21. When the steady operation of the gas turbine GT is finished and the operation shifts from the steady operation to a low-speed operation such as a turning operation or a purging operation (operation at a rotation speed that is 10 to 30% of the rated rotation speed) in a substantially stopped state, the starter motor 15 and the compressor-side rotary shaft 11 are connected again by the clutch mechanism 21, and the compressor-side rotary shaft 11 is driven by the starter motor 15.

In addition, in the present embodiment, the rotation speed of the starter motor 15 is controlled by an inverter control device 55. Such a configuration makes it possible to, using the starter motor 15, perform a low-speed operation such as a turning operation or a purging operation of performing rotation at an extremely low speed (several ten r.p.m) after stopping of the gas turbine GT and before starting-up thereof. That is, the starter motor 15 can be used also for a low-speed operation motor, so that a motor dedicated for low-speed operation is not needed and the starting device 1 can be downsized.

Next, an oil supply/discharge system for a lubricating oil OL in the starting device 1, which constitutes the gas turbine system GS, will be described. In the present embodiment, the lubricating oil OL is supplied to components constituting the starting device 1, and the gas turbine GT, by an electric oil supply pump 57 which is an oil supply device driven independently of the starting device 1 and the gas turbine GT. In the present embodiment, by the oil supply pump 57, the lubricating oil OL is supplied to the starter motor 15, the speed increaser 17, the clutch mechanism 21, and the gas turbine GT. In FIG. 1, an oil supply/discharge path for the speed increaser 17 and oil supply/discharge paths for the parts other than the compressor 3 of the gas turbine GT are not shown. It is noted that, in the present embodiment, the starter motor 15 and the first coupling mechanism 19 are a grease sealing type in which the lubricating oil OL is not needed.

In the case where an oil supply device such as the oil supply pump 57 for supplying oil to the starting device 1 and the gas turbine GT is driven using the drive system in the starting device 1 and the gas turbine GT via, for example, the speed increaser 17, it is necessary to drive the oil supply pump 57 by output of the gas turbine GT even after shifting to a steady operation. Therefore, power loss due to driving of the oil supply pump 57 occurs in the gas turbine GT. However, in the present embodiment, the lubricating oil OL is supplied by the oil supply pump 57 which is driven independently of the starting device 1 and the gas turbine GT, and therefore, with the clutch mechanism 21 provided between the speed increaser 17 and the gas turbine GT (compressor-side rotary shaft 11), it is possible to disconnect the connection between the gas turbine GT and the speed increaser 17 by the clutch mechanism 21 while a steady operation is being performed. Instead of the oil supply pump 57, another type of an oil supply device may be used as long as the oil supply device is driven independently of the starting device 1 and the gas turbine GT. In the shown example, the lubricating oil OL is supplied to components constituting the starting device 1, and the gas turbine GT, by one oil supply pump 57. However, components constituting the starting device 1, and the gas turbine GT, may be individually supplied with lubricating oil by respective oil supply devices driven independently of each other.

For the gas turbine GT, the lubricating oil OL is supplied from the oil supply pump 57 via a gas turbine oil supply path 61 to the gas turbine GT. In addition, the lubricating oil OL supplied to the gas turbine GT is discharged via a gas turbine oil discharge path 63 to an oil collection tank 65. The clutch mechanism 21 has a clutch oil supply path 67 provided so as to communicate with the gas turbine oil supply path 61, and a clutch oil discharge path 69 provided so as to communicate with the gas turbine oil discharge path 63. That is, the clutch oil supply path 67 is provided so as to branch from the gas turbine oil supply path 61. Similarly, the clutch oil discharge path 69 is provided as a passage different from the gas turbine oil discharge path 63, and the downstream end of the clutch oil discharge path 69 merges with the gas turbine oil discharge path 63.

That is, a part of the lubricating oil OL flowing from the oil supply pump 57 into the gas turbine oil supply path 61 flows into the clutch oil supply path 67 from a middle part of the gas turbine oil supply path 61, and then is introduced into the clutch mechanism 21. On the other hand, the lubricating oil OL discharged from the clutch mechanism 21, first, flows into the clutch oil discharge path 69, and then merges with the lubricating oil OL discharged from the gas turbine GT, in the gas turbine oil discharge path 63, and is collected in the oil collection tank 65.

In the above configuration, since the clutch mechanism 21 is attached to the gas turbine GT, it becomes easy to adopt a structure in which the oil supply/discharge paths are partially shared between the gas turbine GT and the clutch mechanism 21, whereby the entire starting device 1 can be configured compactly. It is noted that only one of the clutch oil supply path 67 and the clutch oil discharge path 69 may be provided so as to communicate with the oil supply/discharge path for the gas turbine GT.

Next, the attachment structure of the clutch mechanism 21 to the gas turbine GT will be described. As shown in FIG. 4, the clutch casing 47 of the clutch mechanism 21 is fixed to an engine casing 71 of the gas turbine GT. The engine-side engagement portion 49 of the clutch mechanism 21 is fixed to the compressor-side rotary shaft 11.

More specifically, the clutch casing 47 is detachably attached to the engine casing 71. The engine-side engagement portion 49 is detachably attached to the compressor-side rotary shaft 11. In the shown example, a plurality of bolt insertion holes 75 are arranged in the circumferential direction in an attachment flange 73 provided at the gas turbine side end of the cylindrical clutch casing 47. One end of a stud bolt 76 which is a screw member for casing is inserted into each screw insertion hole 75 of the clutch casing 47 so as to be screwed to a bolt hole 78 provided in an end surface of the engine casing 71, and a nut 77 is screwed to the other end of the stud bolt 76, whereby the clutch casing 47 is detachably attached to the engine casing 71. The engine-side engagement portion 49 has a disk shape and has a plurality of bolt insertion holes 79 arranged in the circumferential direction. On the other hand, a disk-shaped connection flange 81 is provided at an end of the compressor-side rotary shaft 11, and the disk-shaped connection flange 81 has a plurality of bolt insertion holes 83 arranged in the circumferential direction. A bolt 85 which is a screw member for rotary shaft is inserted into each set of the bolt insertion hole 79 of the engine-side engagement portion 49 and the bolt insertion hole 83 provided in the connection flange 81 of the compressor-side rotary shaft 11, and a nut 86 is screwed to the bolt 85, whereby the engine-side engagement portion 49 is detachably attached to the compressor-side rotary shaft 11.

The configuration in which the clutch casing 47 is detachably attached to the engine casing 71, and the manner in which the engine-side engagement portion 49 is detachably attached to the compressor-side rotary shaft 11, are not limited to the above examples. In addition, connection members used for the attachment are not limited to screw members such as bolts or screws, and optional connection members may be used.

By attaching the clutch mechanism 21 to the gas turbine GT as described above, it is possible to attach the starting device 1 to the gas turbine GT without disassembling the gas turbine GT. Therefore, it becomes possible to combine even a conventional gas turbine GT with the starting device 1 without changing the specifications thereof.

As described above, in the starting device 1 according to the present embodiment, the clutch mechanism 21 is provided not between the starter motor 15 and the speed increaser 17 but between the compressor-side rotary shaft 11 and the speed increaser 17. Therefore, in a steady operation in which the speed increaser 17 need not be used, connection between the speed increaser 17 and the compressor-side rotary shaft 11 is disconnected by an action of the clutch mechanism 21. Thus, after disconnection of the clutch mechanism 21 in a steady operation or the like, occurrence of power loss due to wasteful driving of the speed increaser 17 by the compressor-side rotary shaft 11 is avoided.

Although the present invention has been described above in connection with the preferred embodiments with reference to the accompanying drawings, numerous additions, modifications, or deletions can be made without departing from the gist of the present invention. Accordingly, such additions, modifications, or deletions are to be construed as included in the scope of the present invention.

REFERENCE NUMERALS

1 . . . Starting device
3 . . . Compressor
5 . . . . Combustor
11 . . . Compressor-side rotary shaft
15 . . . . Starter motor
17 . . . Speed increaser
19 . . . . First coupling mechanism (Coupling mechanism)
21 . . . Clutch mechanism
57 . . . Oil supply pump (Oil supply device)
GS . . . Gas turbine system
GT . . . . Gas turbine engine

What is claimed is:

1. A starting device for driving a compressor-side rotary shaft of a two-shaft type gas turbine engine at a time of starting the gas turbine engine, the starting device comprising:
a starter motor that serves as a drive source for the compressor-side rotary shaft;

a speed increaser configured to increase a speed of rotation of the starter motor; and a clutch mechanism configured to disconnectably connect the starter motor and the compressor-side rotary shaft with each other, the clutch mechanism being provided between the compressor-side rotary shaft and the speed increaser, wherein the clutch mechanism includes a clutch casing fixed to an engine casing of the gas turbine engine, an engine-side engagement portion fixed to the compressor-side rotary shaft, and a speed-increaser-side engagement portion fixed to a rotary shaft on the speed increaser side, the clutch casing is detachably attached to the engine casing of the gas turbine engine, and the engine-side engagement portion is detachably attached to the compressor-side rotary shaft.

2. The starting device as claimed in claim 1, wherein the clutch mechanism is attached to the gas turbine engine, and the clutch mechanism includes at least one of a clutch oil supply path provided so as to communicate with an oil supply path of the gas turbine engine, and a clutch oil discharge path provided so as to communicate with an oil discharge path of the gas turbine engine.

3. The starting device as claimed in claim 1, further comprising a coupling mechanism provided between the speed increaser and the clutch mechanism and configured to transmit output of the speed increaser to a gas turbine engine side, wherein the coupling mechanism connects the rotary shaft on the speed increaser side and a rotary shaft on the gas turbine engine side with each other such that the rotary shaft on the gas turbine engine side is displaceable in an axial direction relative to the rotary shaft on the speed increaser side.

4. A gas turbine engine system comprising:

the starting device as claimed in claim 1;

a two-shaft type gas turbine engine configured to be started by the starting device; and an oil supply device configured to supply a lubricating oil to the starting device and the gas turbine engine and configured to be driven independently of the starting device and the gas turbine engine.

* * * * *